(12) United States Patent
Wang et al.

(10) Patent No.: US 11,756,327 B2
(45) Date of Patent: Sep. 12, 2023

(54) FINGERPRINT SENSING DEVICE AND METHOD OF MAKING THE SAME

(71) Applicants: William Wang, New Taipei (TW); Yu-Sung Su, New Taipei (TW)

(72) Inventors: William Wang, New Taipei (TW); Yu-Sung Su, New Taipei (TW)

(*) Notice: Subject to any disclaimer, the term of this patent is extended or adjusted under 35 U.S.C. 154(b) by 0 days.

(21) Appl. No.: 17/812,516

(22) Filed: Jul. 14, 2022

(65) Prior Publication Data

US 2023/0027063 A1 Jan. 26, 2023

(30) Foreign Application Priority Data

Jul. 22, 2021 (TW) .................................. 110126999

(51) Int. Cl.
| | |
|---|---|
| *G06F 3/041* | (2006.01) |
| *G06V 40/13* | (2022.01) |
| *G06F 3/044* | (2006.01) |
| *G06F 1/16* | (2006.01) |

(52) U.S. Cl.
CPC ............ *G06V 40/13* (2022.01); *G06F 1/1652* (2013.01); *G06F 1/1656* (2013.01); *G06F 3/0412* (2013.01); *G06F 3/0445* (2019.05); *G06F 3/04164* (2019.05); *G06F 2203/04102* (2013.01); *G06F 2203/04103* (2013.01)

(58) Field of Classification Search
CPC .... G06F 1/1652; G06F 1/1656; G06F 3/0412; G06F 3/04164; G06F 3/0445; G06F 2203/04102; G06F 2203/04103; G06V 40/12; G06V 40/13; H10K 77/10; H10K 77/111

See application file for complete search history.

(56) References Cited

U.S. PATENT DOCUMENTS

| | | | | |
|---|---|---|---|---|
| 5,543,589 | A * | 8/1996 | Buchana | H03K 17/9618 345/173 |
| 2012/0162099 | A1* | 6/2012 | Yoo | G06F 3/0443 345/173 |
| 2012/0242635 | A1* | 9/2012 | Erhart | G06F 1/1684 345/207 |
| 2016/0041637 | A1* | 2/2016 | Guard | G06F 3/04164 345/174 |
| 2016/0210495 | A1* | 7/2016 | Jägemalm | H01L 24/03 |
| 2016/0314334 | A1* | 10/2016 | He | G06V 40/1318 |
| 2017/0053150 | A1* | 2/2017 | Lee | G06V 40/1306 |
| 2019/0087622 | A1* | 3/2019 | Benkley, III | G06V 40/1329 |
| 2019/0251322 | A1* | 8/2019 | Sløgedal | G06K 19/07701 |
| 2020/0034594 | A1* | 1/2020 | Julian | G06V 40/1306 |

FOREIGN PATENT DOCUMENTS

KR 20210145970 A * 12/2021

* cited by examiner

*Primary Examiner* — Joe H Cheng
(74) *Attorney, Agent, or Firm* — Rosenberg, Klein & Lee

(57) ABSTRACT

A fingerprint sensing device includes a double-sided substrate between a first substrate and a second substrate, and first strip electrodes formed on the double-sided substrate and contacting first electroconductive pads disposed on the first substrate and downwardly contacting connecting pads on a second substrate. Second strip electrodes are formed on the double-sided substrate and downwardly contacting second electroconductive pads disposed on the second substrate. The connecting pads and the second electroconductive pads are electrically connected to a chip unit. A method of making the same is also disclosed.

12 Claims, 8 Drawing Sheets

FINGERPRINT SENSING DEVICE AND METHOD OF MAKING THE SAME

CROSS-REFERENCE TO RELATED APPLICATION

This application claims priority to Taiwanese Patent Application No. 110126999, filed on Jul. 22, 2021.

FIELD

The disclosure relates to a biometric sensing device, and more particularly to a fingerprint sensing device.

BACKGROUND

Recently, the fingerprint recognition technology has been widely used in the authentication of identity recognition, encryption mechanisms, mobile payment or electronic payment. For example, a credit card has begun to incorporate fingerprint recognition functions. A conventional credit card with the fingerprint recognition function includes a main card and a secure chip disposed on the main card. Based on one or two sets of fingerprint data registered in a bank, when the conventional credit card with the fingerprint recognition function is placed on a card reader, and when the user's fingerprint is identified, the card reader can read the user's fingerprint data for a transaction.

However, generally, a credit card has to pass ISO7816 smart card standards, one of which is a flexibility test. Because the secure chip is made from a silicone material that has inflexible properties, it is difficult to pass the flexibility test. Further, when the conventional credit card with the fingerprint recognition function is received in a bag or pocket, the secure chip is easily damaged or broken due to folding or bending the conventional credit card with the fingerprint recognition function, thereby causing inconvenience in use. In addition, the process of silicone-based secure chips is limited by the existing semiconductor process and cannot be produced in batches, thereby limiting the production capacity of the secure chips.

SUMMARY

Therefore, one object of the disclosure is to provide a fingerprint sensing device that can alleviate at least one of the drawbacks of the prior art.

According to the object, a fingerprint sensing device includes a substrate unit, a sensing unit, and a chip unit.

The flexible substrate unit includes a first substrate, a double-sided substrate, and a second substrate which are stacked from top to bottom. Each of the first substrate, the double-sided substrate, and the second substrate is flexible. The double-sided substrate has a first surface adjacent to the first substrate, and a second surface adjacent to the second substrate.

The sensing unit includes a plurality of first strip electrodes, a plurality of second strip electrodes, a plurality of first electroconductive pads, a plurality of connecting pads, and a plurality of second electroconductive pads. The first strip electrodes are disposed on the first surface and are disposed between the first substrate and the double-sided substrate. The second strip electrodes are disposed on the second surface and are disposed between the double-sided substrate and the second substrate. The first electroconductive pads are disposed on a bottom surface of the first substrate. The connecting pads and the second electroconductive pads are disposed on a top surface of the second substrate. The first strip electrodes are upwardly connected to the first electroconductive pads. The first electroconductive pads are downwardly connected to the connecting pads. The second strip electrodes are downwardly connected to the second electroconductive pads. The chip unit is disposed on the second substrate and is electrically connected to the connecting pads and the second electroconductive pads.

Another object of the disclosure is to provide a method of making the fingerprint sensing device.

Accordingly, a method of the disclosure includes (A) providing a double-sided substrate that is flexible and rollable and that has a first surface and a second surface opposite to the first surface, laying metal layers respectively on the first and second surfaces;

(B) etching the metal layer on the first surface to form a plurality of spaced-apart first strip electrodes, etching the metal layer on the second surface to form a plurality of spaced-apart second strip electrodes;

(C) providing a first substrate that is flexible and rollable, forming a plurality of first electroconductive pads on a bottom surface of the first substrate, bonding the bottom surface of the first substrate to the first surface of the double-sided substrate in a roll-to-roll laminating manner so that the first electroconductive pads are downwardly connected to the first strip electrodes;

(D) providing a second substrate that is flexible and rollable, forming a plurality of connecting pads and a plurality of second electroconductive pads on a top surface of the second substrate, bonding the top surface of the second substrate to the second surface of the double-sided substrate in a roll-to-roll laminating manner so that the connecting pads are upwardly connected to the first electroconductive pads and the second electroconductive pads are upwardly connected to the second strip electrodes; and (E) placing a chip unit on the second substrate, and electrically connecting the chip unit to the connecting pads and the second electroconductive pads.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
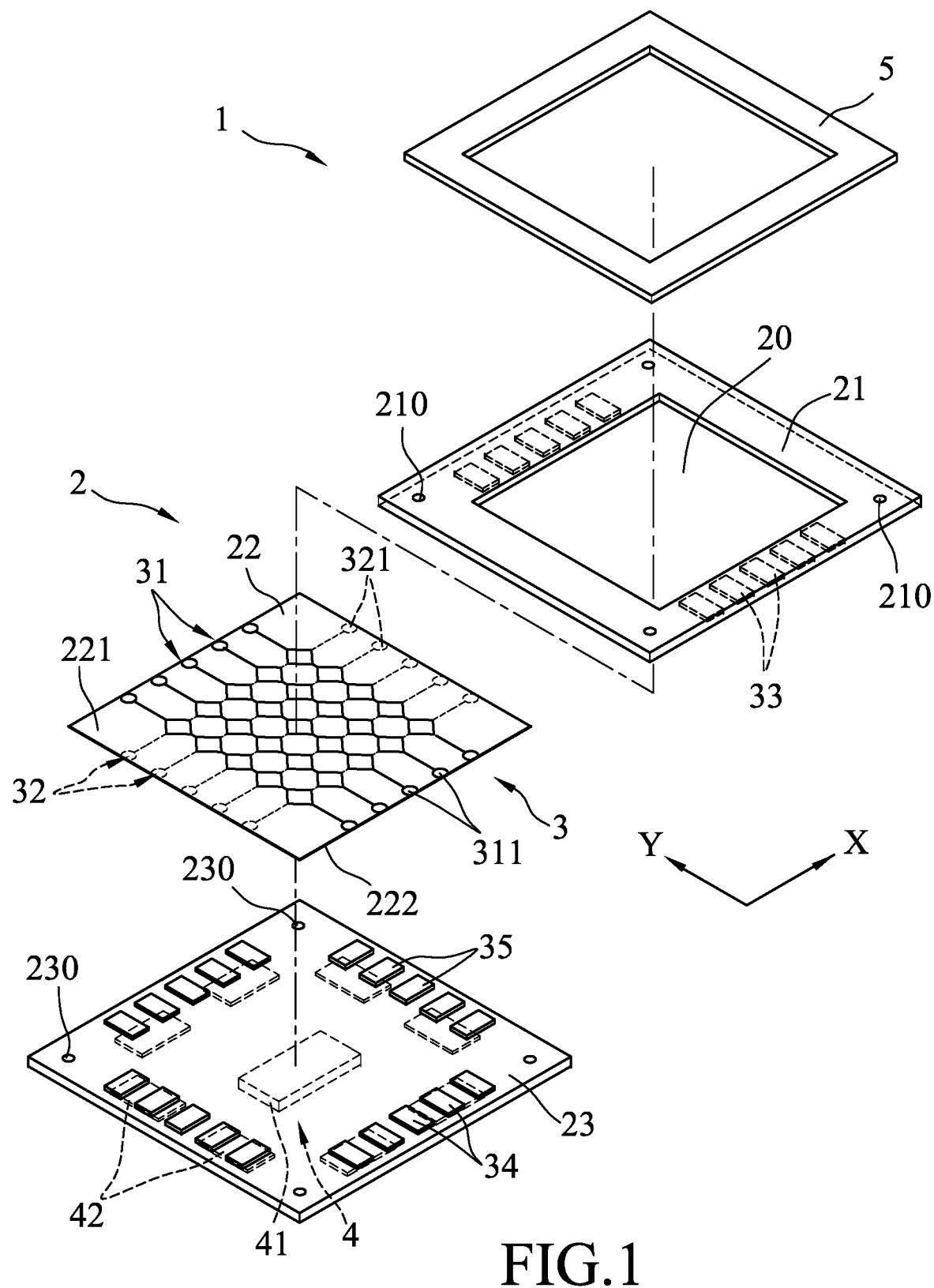
FIG. 1 is an exploded perspective view illustrating a fingerprint sensing device according to a first embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

FIG. 1 illustrate a fingerprint sensing device 1 according to a first embodiment of the disclosure. The fingerprint sensing device 1 includes a flexible substrate unit 2, a sensing unit 3, a chip unit 4, and an antistatic film 5.

The flexible substrate unit 2 includes a first substrate 21, a double-sided substrate 22, and a second substrate 23 which are stacked from top to bottom. Each of the first substrate 21, the double-side substrate 22, and the second substrate 23 is flexible.

The double-sided substrate 22 has a first surface 221 adjacent to the first substrate 21, and a second surface 222 adjacent to the second substrate 23. The first substrate 21 has a window hole 20 and a plurality of first through holes 210 extending therethrough. The second substrate 23 has a plurality of second through holes 230 extending therethrough. An area of the double-sided substrate 22 is smaller than that of each of the first substrate 21 and the second substrate 23. A thickness of each of the first substrate 21, the double-sided substrate 22, and the second substrate 23 is greater than 0 μm and smaller than or equal to 50 μm.

In this embodiment, the double-sided substrate 22 has a length in the second direction (Y), which is smaller than a length of each of the first and second substrates 21, 23 in the second direction (Y). A length of the double-sided substrate 22 in the first direction (X) is smaller than that of each of the first and second substrates 21, 23 in the first direction (X). Particularly, the double-sided substrate 22 further has two lateral sides that are opposite in the second direction (Y) and that respectively indent from two lateral sides of each of the first and second substrates 21, 23 that are opposite in the second direction (Y), and other two lateral sides that are opposite in the first direction (X) and that respectively indent from the other two lateral sides of each of the first and second substrates 21, 23 that are opposite in the first direction (X).

Each of the first and second substrates 21, 23 is made of, but not limited to, a material selected from a flexible printed circuit (fpc) board, a glass fiber (fr4) board, a bismaleimide-triazine (BT) resin, an ajinomoto build-up film (ABF), a molded interconnect substrate (MIS), a modified polyimide (MPI), and a liquid crystal polymer (LCP). The double-sided substrate 22 is made of, but not limited to, a material selected from ultra-thin glass, polyimide (PI), polyethylene terephthalate (PET), modified polyimide (MPI), and liquid crystal polymer (LCP).

In this embodiment, the sensing unit 3 is a capacitive sensing unit and includes a plurality of first strip electrodes 31, a plurality of second strip electrodes 32, a plurality of first electroconductive pads 33, a plurality of connecting pads 34, and a plurality of second electroconductive pads 35. The first strip electrodes 31 are disposed on the first surface 221 and are disposed between the first substrate 21 and the double-sided substrate 22. The second strip electrodes 32 are disposed on the second surface 222 and are disposed between the double-sided substrate 22 and the second substrate 23. The first electroconductive pads 33 are disposed on a bottom surface of the first substrate 21. The connecting pads 34 and the second electroconductive pads 35 are disposed on a top surface of the second substrate 23.

The first strip electrodes 31 disposed on the first surface 221 are spaced apart from each other in a first direction (X). Each of the first strip electrodes 31 has two first terminal portions 311 that are spaced apart from each other in a second direction (Y) and that are disposed on the first surface 221. The first terminal portions 311 of each of the strip electrodes 31 are respectively proximate to the lateral sides of the double-sided substrate 22. The first electroconductive pads 33 disposed on the bottom surface of the first substrate 21 are spaced apart from each other in the first direction (X), and respectively contact the first terminal portions 311 of the first strip electrodes 31. The connecting pads 34 disposed on the second substrate 23 are spaced part from each other in a first direction X, and are upwardly and respectively connected to the first electroconductive pads 33.

Figure 2:
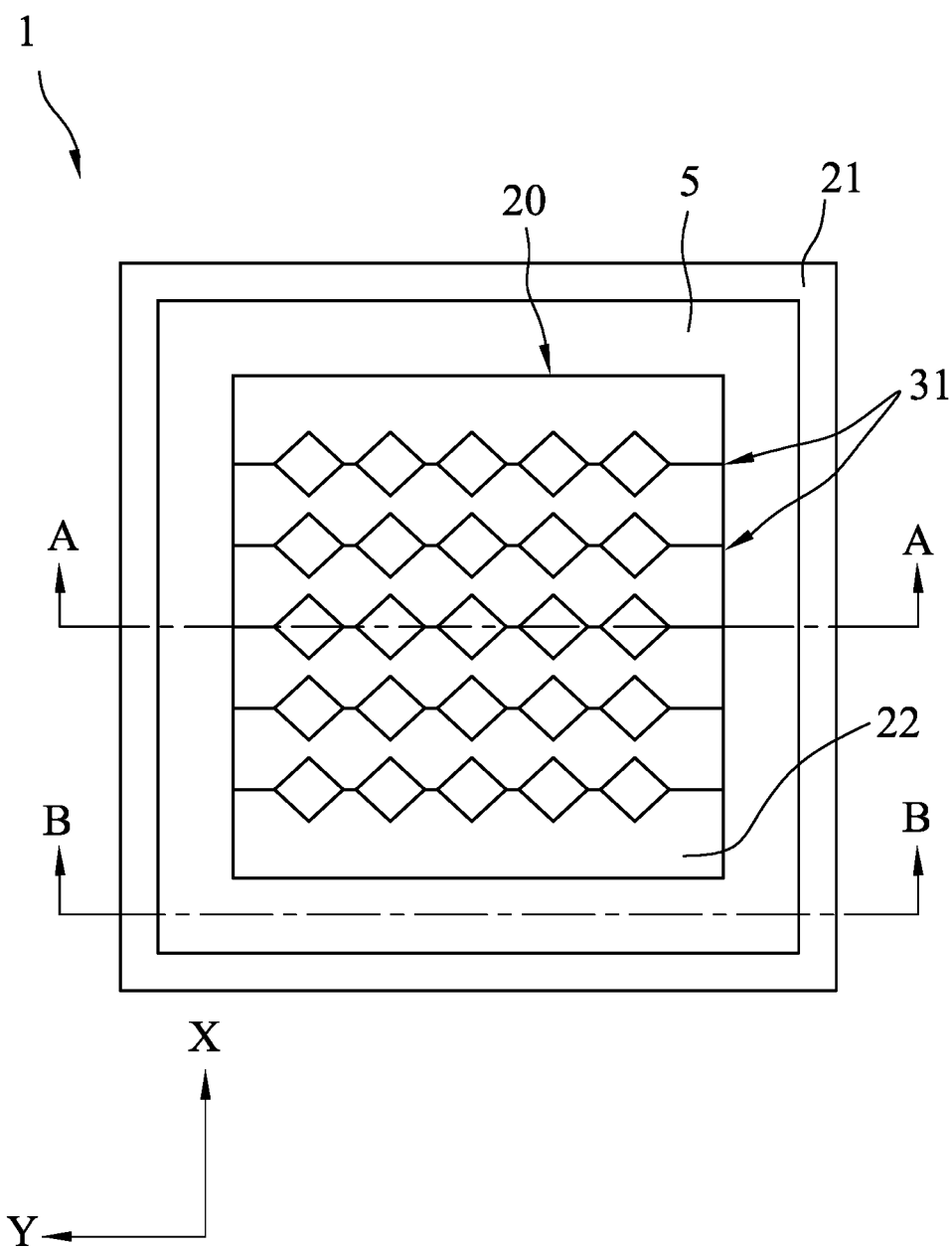
FIG. 2 is a top view of the first embodiment.
Figure 3:
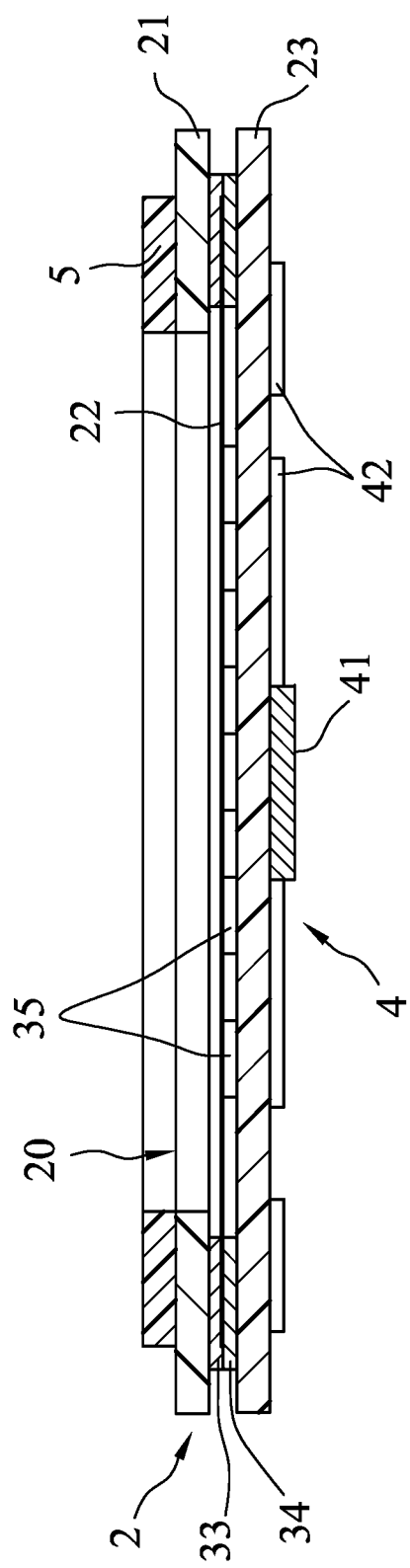
FIG. 3 is a sectional view taken along from line A-A of FIG. 2.
Figure 4:
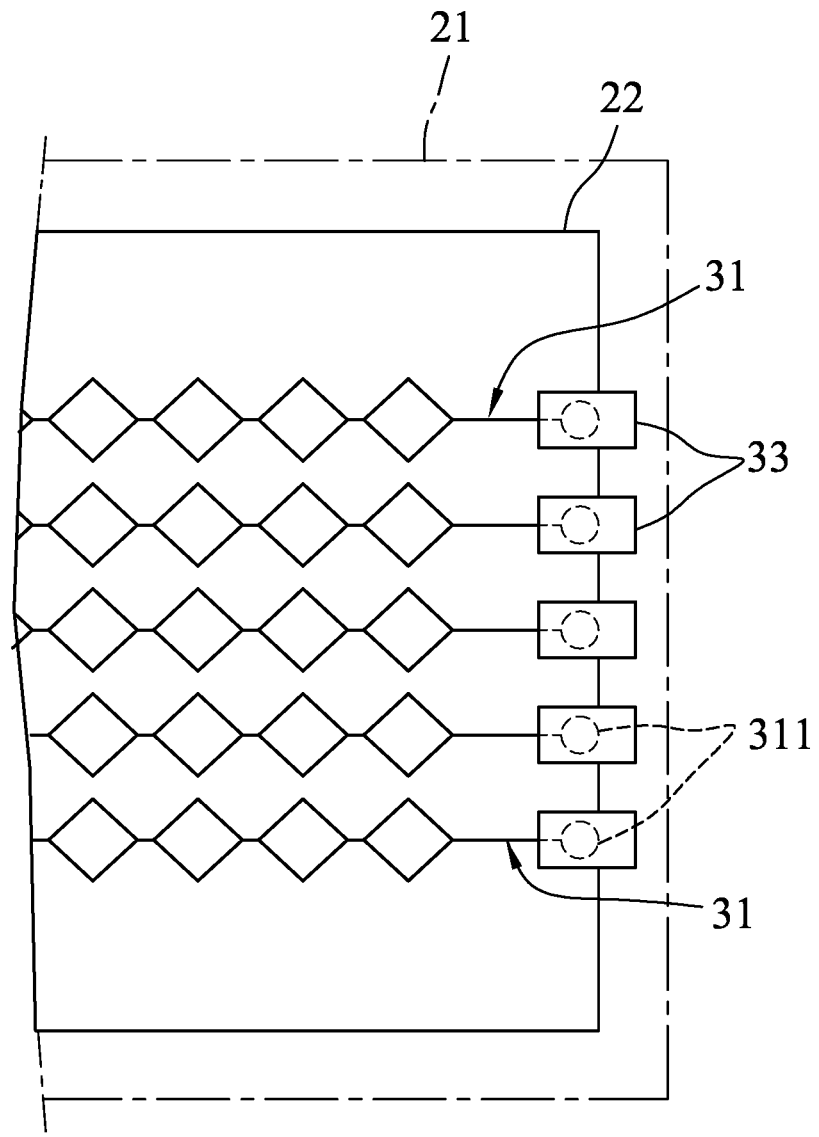
FIG. 4 is a schematic top view of the first embodiment illustrating a double-sided substrate, first strip electrodes, and first electroconductive pads on a first substrate of the fingerprint sensing device.

Referring to FIGS. 2 to 4, in combination with FIG. 1, because the area of the double-sided substrate 22 is smaller than the area of each of the first substrate 21 and the second substrate 23, and because, in the second direction (Y), the two lateral sides of the double-sided substrate 22 respectively indent from two lateral sides of each of the first and second substrates 21, 23 after the first substrate 21, the double-sided substrate 22, and a second substrate 23 are stacked, each first strip electrode 31 can be arranged to upwardly contact a part of the corresponding first electroconductive pad 33. In detail, the first electroconductive pads 33 are formed in pairs, and the first electroconductive pads 33 in each pair are respectively proximate to the lateral sides of the first substrate 21. The connecting pads 34 are formed in pairs, and the connecting pads 34 in each pair are respectively proximate to the lateral sides of the second substrate 23. Each of the first electroconductive pads 33 in each pair has an inner portion superimposed on and in contact with the corresponding first terminal portion 311, and an outer portion that extends outwardly beyond the double-sided substrate 22 and that is superposed on and in contact with the corresponding connecting pad 34 disposed on the second substrate 23. By virtue of a small thickness of the double-sided substrate 22, and flexibility of the first substrate 21 and the second substrate 23, each of the first electroconductive pads 33 can tightly contact the corresponding first terminal portion 311 and the corresponding connecting pad 34 at the same time, thereby making an electrical connection from the first terminal portion 311 to the corresponding connecting pad 34.

The second strip electrodes 32 disposed on the second surface 222 are spaced apart from each other in the second direction (Y). Each of the second strip electrodes 32 has two second terminal portions 321 that are spaced apart from each other in the first direction (X) and that are disposed on the second surface 222. The second electroconductive pads 35 disposed on the bottom surface of the second substrate 23 are spaced apart from each other in the first direction (X), and the second strip electrodes 32 are downwardly connected to the second electroconductive pads 35. In this embodiment, the second electroconductive pads 35 are respectively connected to the second terminal portions 321 of the second strip electrodes 32.

The chip unit 4 is disposed on the second substrate 23, and includes a drive chip 41 and a plurality of metal contacts 42. The drive chip 41 is disposed on a bottom surface of the second substrate 23, and is electrically connected to the connecting pads 34 and the second electroconductive pads 35 through a plurality of conducting wires (not shown).

The metal contacts 42 are disposed on the bottom surface of the second substrate 23 and are electrically connected to the drive chip 41 through a plurality of conducting wires (not shown). Since the connection of the connecting pads 34, the second electroconductive pads 35, and the chip unit 4 is well known in the art, the description thereof will not be repeated here in detail.

Figure 5:
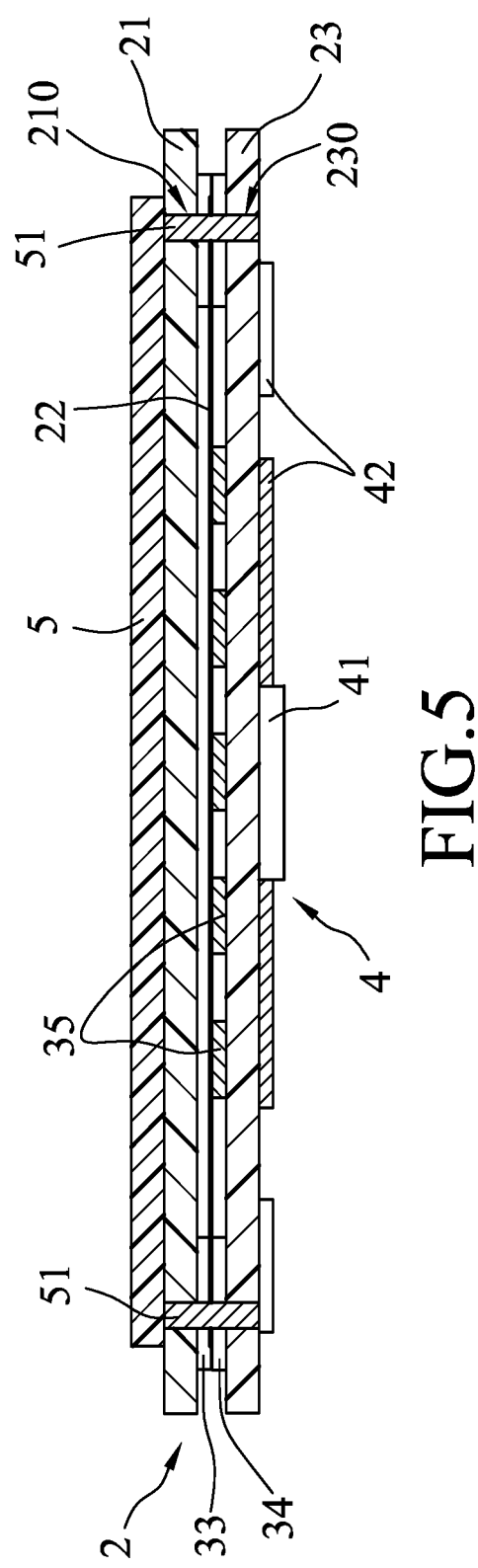
FIG. 5 is a sectional view taken along line B-B of FIG. 2.

Referring to FIGS. 1 and 5, the antistatic film 5 is formed in a looped shape and is disposed on a top surface of the first substrate 21. The antistatic film 5 is electrically connected to the chip unit 4 by a plurality of conductors 51 extending through the first and second through holes 210, 230. Because the connection of the antistatic film 5 to the chip unit 4 is well known in art, the description thereof will not be repeated herein detail.

Each of the first and second strip electrodes 31, 32, the first electroconductive pads 33, the connecting pads 34, the second electroconductive pads 35, and the metal contacts 42 is made of a material such as, but not limited to, gold, copper or aluminum.

In practice, the fingerprint sensing device 1 is combined with a credit card. When the credit card is used, the fingerprint sensing device 1 is first laid against a card reader and then is pressed by a finger. The sensing unit 3, through the change of the capacitance after being pressed, transmits an electrical signal incorporating a fingerprint information to the drive chip 41 and, through the metal contacts 42, to the card reader. As such, the card reader cooperates with a database to compare the fingerprint information to complete the fingerprint authentication for an electronic transaction.

Figure 6:
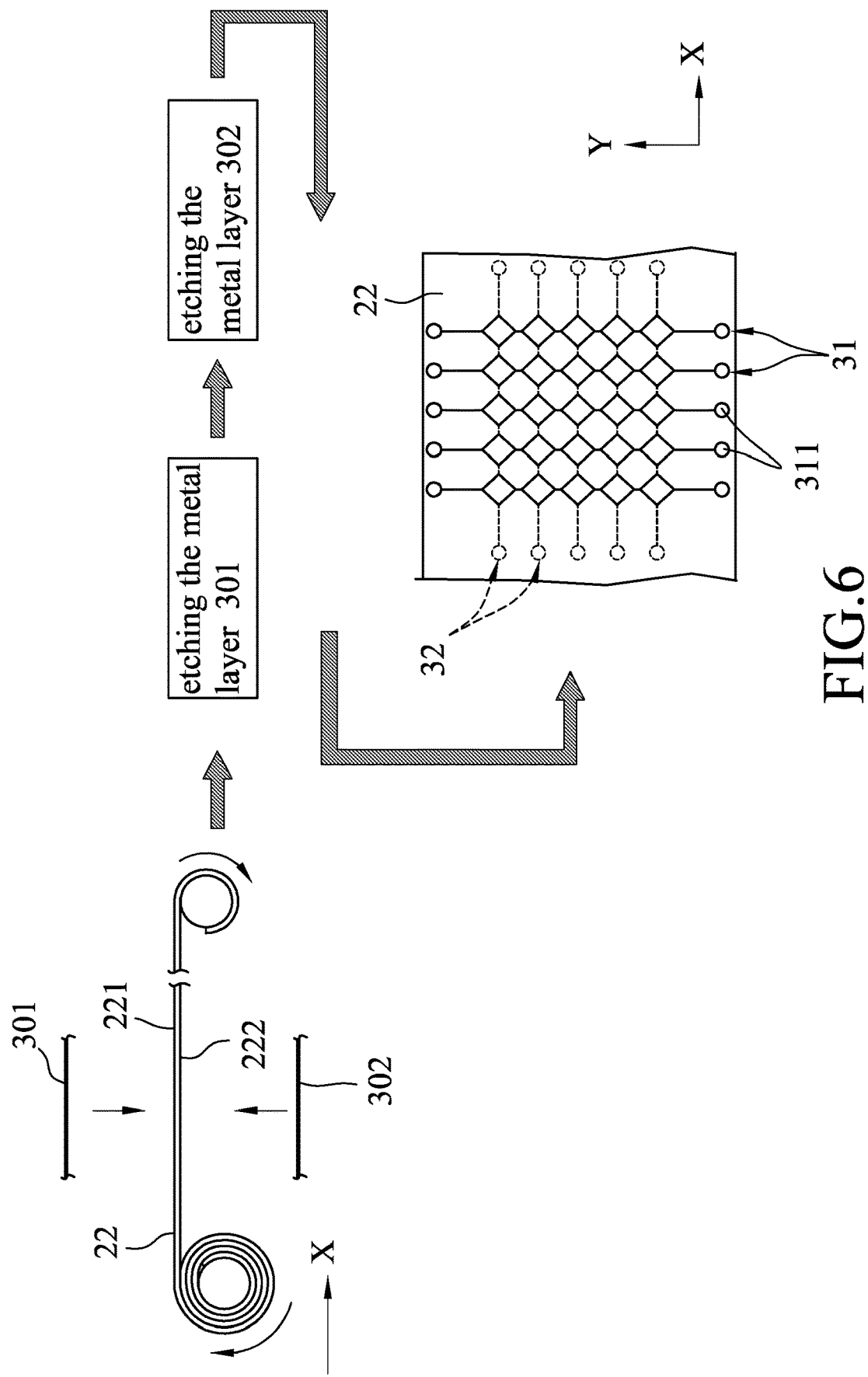
FIGS. 6 to 8 illustrate how to make the fingerprint sensing device by a method of the disclosure.
Figure 7:
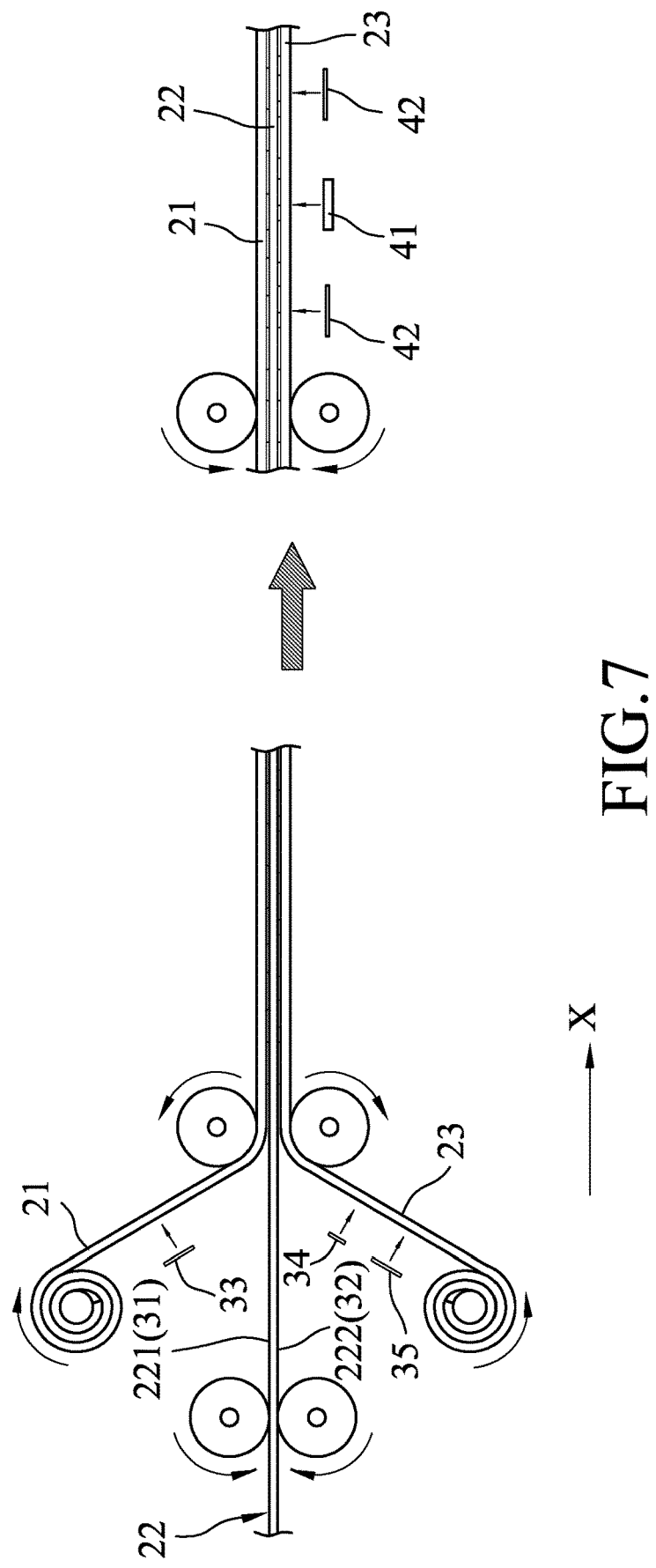
Figure 8:
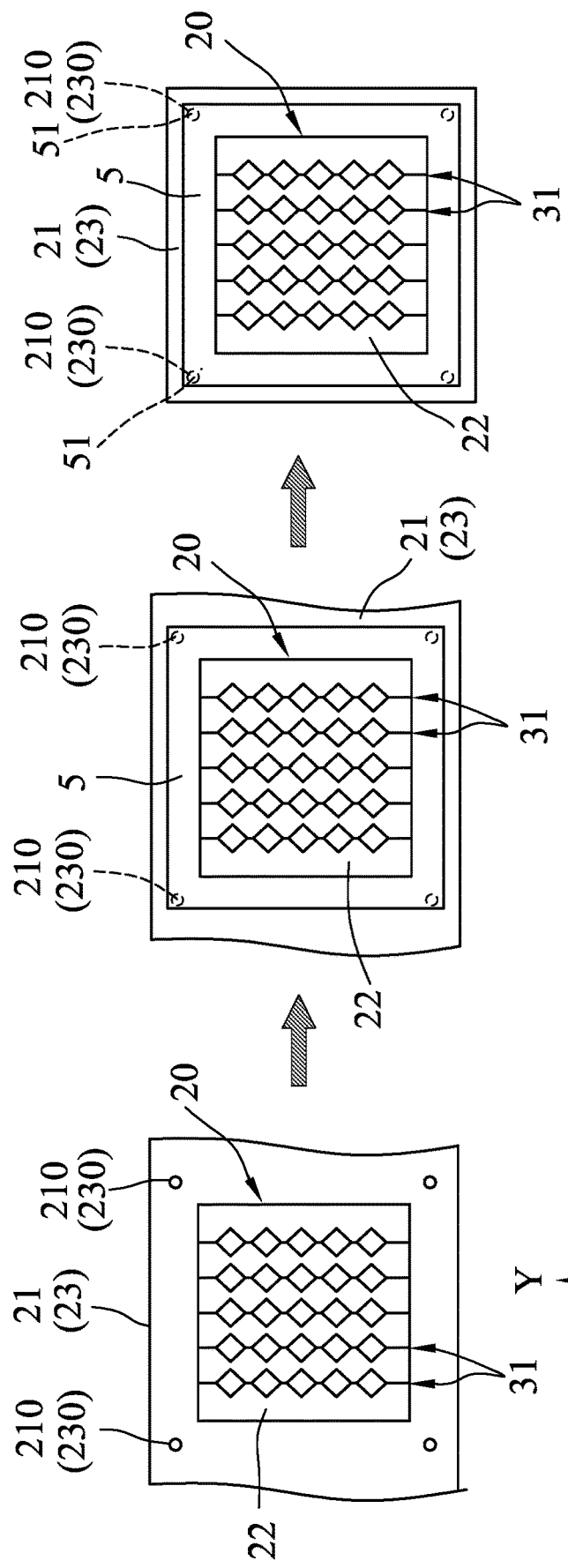

FIGS. 6 to 8 illustrate a method of making a fingerprint sensing device of the disclosure.

As shown in FIG. 6, a first step is performed by providing a double-sided substrate 22 that is flexible and rollable and that has a first surface 221 and a second surface 222 opposite to the first surface 221, and by laying metal layers 301, 302 respectively on the first and second surfaces 221, 222. The metal layers 301, 302 are laid respectively on the first and second surfaces 221, 222 by a method, such as evaporation, or sputtering, but not limited hereto. The material of the metal layers 301, 302 is, for example, but not limited to, gold, copper or aluminum.

A subsequent step is performed by etching the metal layer 301 on the first surface 221 to form a plurality of spaced-apart first strip electrodes 31, and etching the metal layer 302 on the second surface 222 to form a plurality of spaced-apart second strip electrodes 32.

The first strip electrodes 31 are spaced from each other in a first direction (X), and each first strip electrode 31 extends in a second direction (Y). The second strip electrodes 32 are spaced from each other in the second direction (Y), and each second strip electrode 32 extends in the first direction (X). Specifically, the first and second directions (X, Y) are perpendicular to each other.

During etching to form the first and second strip electrodes 31, 32, by using the photomask pattern design, each first strip electrode 31 is formed with two first terminal portions 311 spaced apart in a second direction (Y) on the first surface 221, and each second strip electrode 32 is formed with two second terminal portions 321 spaced apart in the first direction (X) on the second surface 222. Each of the metal layers 301, 302 is etched by, but not limited to, a wet or dry etching process.

Referring to FIG. 7, another subsequent step is performed by providing a first substrate 21 that is flexible and rollable and that has an window hole 20, forming a plurality of first electroconductive pads 33 on a bottom surface of the first substrate 21, and bonding the bottom surface of the first substrate 21 to the first surface 221 of the double-sided substrate 22 in a roll-to-roll laminating manner so that the first electroconductive pads 33 are downwardly connected to the first strip electrodes 31.

The first electroconductive pads 33 are formed in pairs on the bottom surface of the first substrate 21, the first electroconductive pads 33 in each pair are spaced in the second direction (Y), and the pairs of the first electroconductive pads 33 are spaced in the first direction (X). As such, the first electroconductive pads 33 respectively contact the first terminal portions 311 of the first strip electrodes 31.

Still another subsequent step is performed by providing a second substrate 23 that is flexible and rollable, forming a plurality of connecting pads 34 and a plurality of second electroconductive pads 35 on a top surface of the second substrate 23, and bonding the top surface of the second substrate 23 to the second surface 222 of the double-sided substrate 22 in a roll-to-roll laminating manner so that the connecting pads 34 are upwardly connected to the first electroconductive pads 33 and the second electroconductive pads 35 are upwardly connected to the second strip electrodes 32.

The connecting pads 34 are formed in pairs on the top surface of the second substrate 23. The connecting pads 34 of each pair are spaced in the second direction (Y). The pairs of the connecting pads 34 are spaced in the first direction (X). The second electroconductive pads 35 are formed in pairs on the top surface of the second substrate 23. The second electroconductive pads 35 of each pair are spaced in the first direction (X). The pairs of the second electroconductive pads 35 are spaced in the second direction (Y). After the first substrate 21, the double-sided substrate 22, and the second substrate 23 are stacked and assembled, the connecting pads 34 are upwardly connected to the first electroconductive pads 33, and the second electroconductive pads 35 are upwardly connected to the second terminal portions 321 of the second strip electrodes 32.

With using flip-chip or other feasible techniques, a chip unit 4 is placed on the second substrate 23, electrically connected to the connecting pads 34 and the second electroconductive pads 35, and is then packaged.

The chip unit 4 includes a drive chip 41 disposed on a bottom surface of the second substrate 23 and a plurality of metal contacts 42 that are disposed on the bottom surface of the second substrate 23 and that are electrically connected to the drive chip 41.

Referring to FIGS. 5 and 8, still another step is performed by forming a plurality of first through holes 210 in the first substrate 21, forming a plurality of second through holes 230 in the second substrate 23, disposing an antistatic film 5 on a top surface of the first substrate 21 in a roll-to-roll laminating manner, and providing a plurality of conductors 51 that extend through the first and second through holes 210, 230 and that electrically connect the antistatic film 5 and the chip unit 4.

Afterwards, a trimming process is performed to form a plurality of individual fingerprint sensing devices 1.

Figure 9:
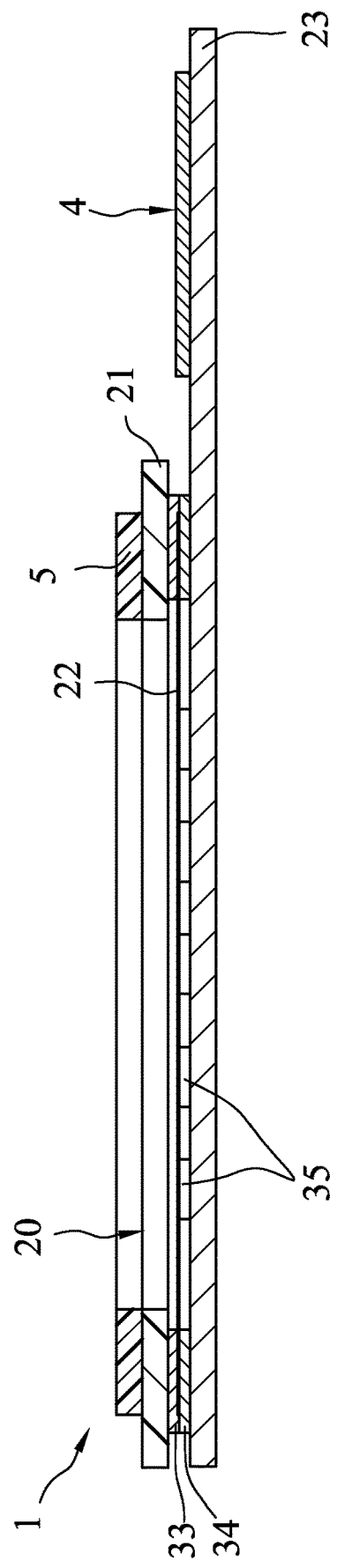
FIG. 9 is a sectional view illustrating a fingerprint sensing device according to a second embodiment of the disclosure.

FIG. 9 illustrates a fingerprint sensing device 1 according to a second embodiment of the disclosure. The difference from the first embodiment resides in that the chip unit 4 in the second embodiment is disposed on the top surface of the second substrate 23. As such, the manufacturing steps for the second substrate 23 can be concentrated on a same side thereof to meet different applications.

In summary, by virtue of the flexible substrate unit 2, the fingerprint sensing device 1 is flexible and is capable of passing the credit card flexibility test. Compared to the conventional sheet-to-sheet process, which requires clamping, the method of the disclosure making the fingerprint sensing device 1 is suitable for using the roll-to-roll techniques, and can reduce waste, significantly increase production capacity, and reduce the cost of production materials.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A fingerprint sensing device, comprising:
    a flexible substrate unit including a first substrate, a double-sided substrate, and a second substrate which are stacked from top to bottom, each of said first substrate, said double-sided substrate, and said second substrate being flexible, said double-sided substrate having a first surface adjacent to said first substrate, and a second surface adjacent to said second substrate;
    a sensing unit including:
        a plurality of first strip electrodes that are disposed on said first surface and that are disposed between said first substrate and said double-sided substrate,
        a plurality of second strip electrodes that are disposed on said second surface and that are disposed between said double-sided substrate and said second substrate,
        a plurality of first electroconductive pads disposed on a bottom surface of said first substrate, and
        a plurality of connecting pads and a plurality of second electroconductive pads disposed on a top surface of said second substrate,
        said first strip electrodes being upwardly connected to said first electroconductive pads,
        said first electroconductive pads being downwardly connected to said connecting pads,
        said second strip electrodes being downwardly connected to said second electroconductive pads; and
    a chip unit disposed on said second substrate and that is electrically connected to said connecting pads and said second electroconductive pads.

2. The fingerprint sensing device as claimed in claim 1, wherein:
    said first strip electrodes disposed on said first surface are spaced apart from each other in a first direction, each of said first strip electrodes having two first terminal portions that are spaced apart from each other in a second direction and that are disposed on said first surface;
    said first electroconductive pads disposed on said bottom surface of said first substrate are spaced apart from each other in the first direction, and respectively contact said first terminal portions of said first strip electrodes;
    said second strip electrodes disposed on said second surface are spaced apart from each other in the second direction, each of said second strip electrodes having two second terminal portions that are spaced apart from each other in the first direction and that are disposed on said second surface; and
    said second electroconductive pads disposed on said top surface of said second substrate are spaced apart from each other in the second direction, and are respectively connected to said second terminal portions of said second strip electrodes.

3. The fingerprint sensing device as claimed in 1, wherein said connecting pads disposed on said second substrate are spaced part from each other in a first direction, and are upwardly and respectively connected to said first electroconductive pads.

4. The fingerprint sensing device as claimed in claim 1, further comprising an antistatic film disposed on a top surface of said first substrate, said first substrate having a plurality of first through holes, said second substrate having a plurality of second through holes, said antistatic film being electrically connected to said chip unit by a plurality of conductors extending through said first and second through holes.

5. The fingerprint sensing device as claimed in claim 1, wherein:
    each of said first substrate and said second substrate is made of a material selected from a flexible printed circuit board, a glass fiber board, a bismaleimide-triazine resin, an ajinomoto build-up film, a molded interconnect substrate, a modified polyimide, and a liquid crystal polymer; and
    said double-sided substrate is made of a material selected from ultra-thin glass, polyimide, polyethylene terephthalate, modified polyimide, and liquid crystal polymer.

6. The fingerprint sensing device as claimed in claim 1, wherein:
    said double-sided substrate has a length in the second direction, which is smaller than a length of each of said first substrate and said second substrate in the second direction, said double-sided substrate having two lateral sides that are opposite in the second direction and that respectively indent from two lateral sides of each of said first substrate and said second substrate that are opposite in the second direction;
    each of said first strip electrodes has two first terminal portions that are respectively proximate to said lateral sides of said double-sided substrate;
    said connecting pads are formed in pairs, said connecting pads in each pair being respectively proximate to said lateral sides of said second substrate;
    said first electroconductive pads are formed in pairs, said first electroconductive pads in each pair being respectively proximate to said lateral sides of said first substrate, each of said first electroconductive pads in each pair having an inner portion superimposed on and in contact with a corresponding one of said first terminal portions, and an outer portion that extends outwardly beyond said double-sided substrate and that is superposed on and in contact with a corresponding one of said connecting pads disposed on said second substrate.

7. A method for making a fingerprint sensing device, comprising:

(A) providing a double-sided substrate that is flexible and rollable and that has a first surface and a second surface opposite to the first surface, and laying metal layers, respectively, on the first and second surfaces;
(B) etching the metal layer on the first surface to form a plurality of spaced-apart first strip electrodes, etching the metal layer on the second surface to form a plurality of spaced-apart second strip electrodes;
(C) providing a first substrate that is flexible and rollable, forming a plurality of first electroconductive pads on a bottom surface of the first substrate, bonding the bottom surface of the first substrate to the first surface of the double-sided substrate in a roll-to-roll laminating manner so that the first electroconductive pads are downwardly connected to the first strip electrodes;
(D) providing a second substrate that is flexible and rollable, forming a plurality of connecting pads and a plurality of second electroconductive pads on a top surface of the second substrate, bonding the top surface of the second substrate to the second surface of the double-sided substrate in a roll-to-roll laminating manner so that the connecting pads are upwardly connected to the first electroconductive pads and the second electroconductive pads are upwardly connected to the second strip electrodes; and
(E) placing a chip unit on the second substrate, and electrically connecting the chip unit to the connecting pads and the second electroconductive pads.

8. The method as claimed in claim 7, wherein:
step (B) includes spacing the first strip electrodes from each other in a first direction, and forming each of the first strip electrodes with two first terminal portions spaced apart in a second direction on the first surface; and
step (C) includes forming the first electroconductive pads in pairs on the bottom surface of the first substrate, spacing the first electroconductive pads in each pair in the second direction, and spacing the pairs of the first electroconductive pads in the first direction.

9. The method as claimed in claim 8, wherein:
step (B) includes spacing the second strip electrodes from each other in the second direction, and forming each of the second strip electrodes with two second terminal portions spaced apart in the first direction on the second surface; and
step (D) includes forming the second electroconductive pads in pairs on the top surface of the second substrate, spacing the second electroconductive pads of each pair in the first direction, and spacing the pairs of the second electroconductive pads in the second direction.

10. The method as claimed in claim 9, wherein:
step (D) includes forming the connecting pads in pairs on the top surface of the second substrate, spacing the connecting pads of each pair in the second direction, and spacing the pairs of the connecting pads in the first direction; and
in step (E), the chip unit includes a drive chip disposed on a bottom surface of the second substrate and a plurality of metal contacts that are disposed on the bottom surface of the second substrate and that are electrically connected to the drive chip.

11. The method as claimed in claim 10, further comprising (F) forming a plurality of first through holes in the first substrate, forming a plurality of second through holes in the second substrate, disposing an antistatic film on a top surface of the first substrate in a roll-to-roll laminating manner, and providing a plurality of conductors that extend through the first and second through holes and that electrically connect the antistatic film and the chip unit.

12. The method as claimed in claim 7, further comprising (F) forming a plurality of first through holes in the first substrate, forming a plurality of second through holes in the second substrate, disposing an antistatic film on a top surface of the first substrate in a roll-to-roll laminating manner, and providing a plurality of conductors that extend through the first and second through holes and that electrically connect the antistatic film and the chip unit.

\* \* \* \* \*